(12) United States Patent
Nagarajan et al.

(10) Patent No.: US 12,015,558 B2
(45) Date of Patent: Jun. 18, 2024

(54) ENHANCING CLASSIFICATION OF DATA PACKETS IN AN ELECTRONIC DEVICE

(71) Applicant: ARRIS Enterprises LLC, Suwanee, GA (US)

(72) Inventors: Sabarinathan Nagarajan, Karnataka (IN); Ian G. Wheelock, Cork (IE); Lakshmi Arunkumar, Karnataka (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 244 days.

(21) Appl. No.: 17/525,069

(22) Filed: Nov. 12, 2021

(65) Prior Publication Data

US 2022/0174017 A1 Jun. 2, 2022

Related U.S. Application Data

(60) Provisional application No. 63/118,818, filed on Nov. 27, 2020.

(51) Int. Cl.
*H04L 47/2441* (2022.01)
*H04L 45/74* (2022.01)
*H04L 47/20* (2022.01)

(52) U.S. Cl.
CPC .......... *H04L 47/2441* (2013.01); *H04L 45/74* (2013.01); *H04L 47/20* (2013.01)

(58) Field of Classification Search
CPC ..... H04L 47/2441; H04L 45/74; H04L 47/20; H04L 41/16; G06N 20/00
See application file for complete search history.

(56) References Cited

U.S. PATENT DOCUMENTS

| 10,243,980 B2 | 3/2019 | Vasseur et al. |
| 11,038,906 B1 * | 6/2021 | Bingham ............ H04L 63/1425 |
| 2014/0064080 A1 * | 3/2014 | Stevens ............... H04L 47/2441 370/235 |

(Continued)

OTHER PUBLICATIONS

International Preliminary Report on Patentability and Written Opinion issued Jun. 8, 2023 in International Application No. PCT/US2021/059066.

(Continued)

*Primary Examiner* — Ricky Q Ngo
*Assistant Examiner* — Kabir U Jahangir
(74) *Attorney, Agent, or Firm* — Wenderoth, Lind & Ponack, L.L.P.

(57) ABSTRACT

An electronic device in a network capable of enhancing classification of packets received by the electronic device is provided that includes a network interface, a non-transitory memory having instructions stored thereon, and a hardware processor. The hardware processor executes the instructions to receive a packet in at least one packet flow to be processed using a first service flow or a second service flow, determine whether a packet to be processed using the second service flow is incorrectly classified for processing using the first service flow, and move the incorrectly classified packet to the second service flow. A notification including data is transmitted for the incorrectly classified packet to a machine learning algorithm (MLA). The MLA is trained using the data and the trained MLA categorizes at least one new packet to be processed using the first or second service flow.

20 Claims, 7 Drawing Sheets

(56) References Cited

U.S. PATENT DOCUMENTS

| | | | | |
|---|---|---|---|---|
| 2018/0357568 A1* | 12/2018 | Ding | ................... | G06F 11/2257 |
| 2020/0169509 A1* | 5/2020 | Tigli | ................... | H04L 47/2441 |
| 2021/0224611 A1* | 7/2021 | Yu | ......................... | G06N 20/00 |
| 2021/0390385 A1* | 12/2021 | Saleh | ..................... | G06N 3/045 |
| 2023/0018188 A1* | 1/2023 | Shang | ................... | G06N 20/00 |
| 2023/0141237 A1* | 5/2023 | Yao | .................... | H04L 41/5058 |
| | | | | 709/224 |

OTHER PUBLICATIONS

International Search Report and the Written Opinion of the International Searching Authority dated Feb. 16, 2022 in International (PCT) Application No. PCT/US2021/059066.

Punitha V et al: "Traffic classification for connectionless services with incremental learning", Computer Communications, Elsevier Science Publishers BV, Amsterdam, NL, vol. 150, Nov. 15, 2019 (Nov. 15, 2019), pp. 185-199, XP086011225, ISSN: 0140-3664, DOI: 10.1016/J.COMCOM.2019.11.017 [retrieved on Nov. 15, 2019] abstract sections 1-4.

\* cited by examiner

ENHANCING CLASSIFICATION OF DATA PACKETS IN AN ELECTRONIC DEVICE

TECHNICAL FIELD

The subject matter of the present disclosure relates generally to enhancing classification of data packets in an electronic device.

BACKGROUND

Data Over Cable Service Interface Specification (DOCSIS) is an international telecommunications standard that permits the addition of high-bandwidth data transfer to an existing cable television or computer system. It may be used to provide Internet access over an existing hybrid fiber-coaxial infrastructure.

Low latency technology developed for DOCSIS, commonly referred to as low latency DOCSIS (LLD), is designed to achieve approximately a one millisecond round-trip delay time for time sensitive applications like online gaming. In LLD, packet flow traffic is classified into either non-queue building application traffic that requires low latency or queue building application traffic that can tolerate a higher latency. Different packet service flows can be created, one for LLD packet flows and another for classic packet flows. Additionally, packets are queued in each service flow, so that there is a LLD service flow queue and a classic service flow queue.

A Queue Protection function can also be implemented to identify packets in the LLD service flow queue that are contributing to the growth of the LLD service flow queue and thus delay in the round-trip delay time. The identified packets that are causing delay in the round-trip delay time are moved to the classic service flow queue to avoid flooding the LLD service flow queue.

However, not all applications correctly classify packets as LLD initially. For example, some packets that are classified to be processed in the classic service flow should actually be classified to be processed in the low latency service flow. This incorrect classification contributes to delay in the low latency service flow queue and negatively effects the round-trip time of genuine low latency packets. Therefore, known techniques or applications implemented for classifying packet flows in an electronic device such as a modem or gateway have drawbacks.

Thus, it would be advantageous and an improvement over the relevant technology to provide an apparatus, method, and computer-readable recording medium capable of enhancing classification of data packets in an electronic device to facilitate reducing the delay of processing packets by the electronic device.

SUMMARY

An aspect of the present disclosure provides an electronic device capable of enhancing classification of packets in a network. The electronic device includes a network interface, a non-transitory memory having instructions stored thereon, and a hardware processor. The hardware processor is configured to execute the instructions to receive, using the network interface, a packet to be processed using a first service flow or a second service flow. The first service flow includes at least one service flow.

Moreover, the hardware processor is configured to execute the instructions to determine whether a packet to be processed using the second service flow is incorrectly classified for processing using the first service flow, move the incorrectly classified packet to the second service flow, and transmit a notification for the incorrectly classified packet to a machine learning algorithm (MLA). Each notification includes data related to the incorrectly classified packet.

The hardware processor is further configured to execute the instructions to train the MLA using the data in the notifications, and to categorize, using the trained MLA, at least one new packet to be processed using the first or second service flow. The at least one new packet is processed based on the category.

In an aspect of the present disclosure the hardware processor is further configured to execute the instructions to change information in a header of the at least one new packet to correspond to the category determined by the trained MLA.

In another aspect of the present disclosure the hardware processor is further configured to execute the instructions to transmit, using the network interface, the notifications to a cloud-based device for training an updated MLA, and to receive, using the network interface, the updated MLA from the cloud-based device.

In yet another aspect of the present disclosure, the first service flow is a low latency service flow and the second service flow is a classic service flow.

An aspect of the present disclosure provides a method of enhancing classification of data packets in a network. The method includes receiving, by an electronic device, a packet to be processed using a first service flow or a second service flow. The first service flow includes at least one service flow. Moreover the method includes determining, by the electronic device, whether a packet to be processed using the second service flow is incorrectly classified for processing using the first service flow, moving the incorrectly classified packet to the second service flow, and transmitting a notification for the incorrectly classified packet to a machine learning algorithm (MLA). Each notification includes data related to the incorrectly classified packet which is used to train the MLA. The trained MLA categorizes at least one new packet to be processed using the first or second service flow and the at least one new packet is processed based on the category.

In an aspect of the present disclosure the method includes changing, by the electronic device, information in a header of the at least one new packet to correspond to the category determined by the trained MLA.

In another aspect of the present disclosure the method includes transmitting, by the electronic device, the notifications to a cloud-based device for training an updated MLA, and receiving, by the electronic device, the updated MLA from the cloud-based device.

An aspect of the present disclosure provides a non-transitory computer-readable recording medium in an electronic device for enhancing classification of data packets in a network. The non-transitory computer-readable recording medium stores instructions which when executed by a hardware processor performs the steps of the methods described above.

BRIEF DESCRIPTION OF THE DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
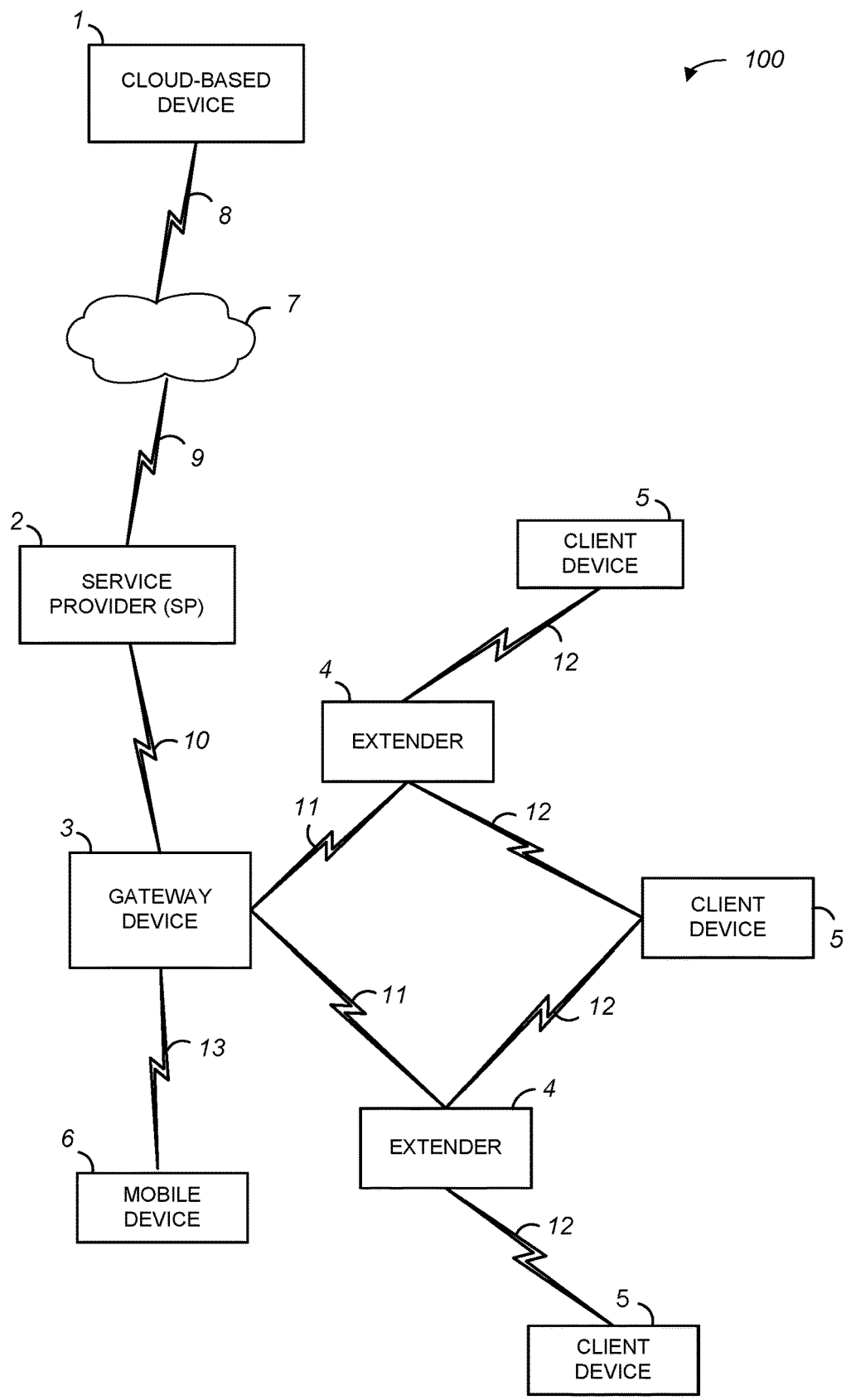
FIG. 1 is a schematic diagram illustrating an exemplary system for enhancing classification of data packets according to an embodiment of the present application.

FIG. 1 is an exemplary system 100 for enhancing classification of packets in accordance with an embodiment of the present application. As shown in FIG. 1, the main elements of the system 100 include a cloud-based device 1 and a service provider (SP) 2 communicatively connected via the Internet 7, as well as a gateway device 3 communicatively connected to the Internet 7 via the SP 2 and also connected to different wireless devices such as Wi-Fi extenders 4, client devices 5, and a mobile device 6.

The system 100 shown in FIG. 1 includes wireless devices (e.g., extenders 4, client devices 5, and mobile device 6) that may be connected in one or more wireless networks (e.g., private, guest, iControl, backhaul network, or Internet of things (IoT) networks) within the system 100. Additionally, there could be some overlap between devices in the different networks. That is, one or more network devices could be located in more than one network. For example, wireless extenders 4 could be located both in a private network for providing content and information to a client device and also in a backhaul network.

In FIG. 1, the cloud-based device 1 may be any type of server computer implemented as a network server or network computer capable of receiving and transmitting notifications including packet data to and from the gateway device 3 in the system 100. The cloud-based device 1 can also train a machine learning algorithm (MLA) stored therein using the packet data received from the gateway device 3, and transmit the trained MLA to the gateway device 3 in the system 100. The cloud-based device 1 can also transmit notifications including packet data, and trained MLAs to other devices outside of the system 100 (e.g., other gateway devices as shown in the system 200 of FIG. 2).

The SP 2 can be, for example, a multiple system operator (MSO) that provides streaming video or any computer for connecting the gateway device 3 to the Internet 7. The SP 2 can transmit policy control information for receipt by devices in the system 100, for example, the gateway device 3. Policy control information includes, but is not limited to, rules regarding certain periods of time during which results generated by a machine learning algorithm may be modified to treat packet flows as low latency or certain periods of time in which low latency rules should not be applied.

The connection 8 between the cloud-based device 1 and the Internet 7, the connection 9 between the Internet 7 and the SP 2, and the connection 10 between the SP 2 and the gateway device 3 can be implemented using a wide area network (WAN), a virtual private network (VPN), metropolitan area networks (MANs), system area networks (SANs), a DOCSIS network, a fiber optics network (e.g., FTTH (fiber to the home) or FTTX (fiber to the x), or hybrid fiber-coaxial (HFC)), a digital subscriber line (DSL), a public switched data network (PSDN), a global Telex network, or a 2G, 3G, 4G or 5G network, for example.

The connection 10 can further include as some portion thereof a broadband mobile phone network connection, an optical network connection, or other similar connections. For example, the connection 10 can also be implemented using a fixed wireless connection that operates in accordance with, but is not limited to, 3rd Generation Partnership Project (3GPP) Long Term Evolution (LTE) or 5G protocols.

The gateway device 3 is a hardware electronic device that performs the function of a stand-alone cable modem or a combination modem and gateway device that combines the functions of a modem, access point, and/or a router for providing received content to network devices (e.g., client devices 5, wireless extenders 4 and mobile device 6) in the systems 100. It is also contemplated by the present disclosure that the gateway device 3 can include the function of, but is not limited to, an Internet Protocol/Quadrature Amplitude Modulator (IP/QAM) set-top box (STB) or smart media device (SMD) that is capable of decoding audio/video content, and playing over-the-top (OTT) or multiple system operator (MSO) provided content.

The gateway device 3 can communicate with other devices in the systems 100, for example, the cloud-based device 1 to transmit notifications including packet data and to receive notifications including packet data, trained or updated MLAs, and policy control information. The gateway device 3 is capable of processing received packets according to low latency technology developed for the Data Over Cable Service Interface Specification (DOCSIS) standard. Such technology is commonly referred to as LLD.

The gateway device 3 is connected to the wireless extenders 4 via connection 11. The connection 11 between the gateway device 3 and the wireless extenders 4 can be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands.

Additionally, the connection 11 can be implemented using a wireless connection that operates in accordance with, but is not limited to, IEEE 802.11 protocol, RF4CE protocol, ZigBee protocol, Z-Wave protocol, or IEEE 802.15.4 protocol. It is also contemplated by the present disclosure that the connections 11 can include connections to a media over coax (MoCA) network. One or more of the connections 11 can also be a wired Ethernet connection.

The wireless extenders 4 can be, for example, hardware electronic devices such as access points used to extend the wireless network by receiving the signals transmitted by the gateway device 3 and rebroadcasting the signals to, for example, client devices 5, which may be out of range of the gateway device 3. The wireless extenders 4 can also receive signals from the client devices 5 and rebroadcast the signals to the gateway device 3 or other client devices 5.

The connection 12 between the wireless extenders 4 and the client devices 5 may be implemented through a wireless connection that operates in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as the CBRS band, 2.4 GHz bands, 5 GHz bands, 6 GHz bands, or 60 GHz bands. Additionally, the connection 12 may be implemented using a wireless connection that operates in accordance with, but is not limited to, RF4CE protocol, ZigBee protocol, Z-Wave protocol, or IEEE 802.15.4 protocol. Also, one or more of the connections 12 can also be a wired Ethernet connection.

The client devices 5 can be, for example, a hand-held computing device, a personal computer, an electronic tablet, a smart phone, smart speakers, an IoT device, an iControl device, or other similar wireless hand-held consumer electronic device capable of executing and displaying the content received through, for example, the gateway device 3. Additionally, the client devices 5 can be a TV, an IP/QAM STB or an SMD that is capable of decoding audio/video content, and playing over OTT or MSO provided content received through the gateway device 3. Client devices 5 can transmit data to other devices (e.g. wireless extenders 4, client devices 5 and mobile device 6) in the system 100. Such data can be transmitted as packet flows.

The connection 13 between the gateway device 3 and the mobile device 6 may be implemented through a wireless connection that operates in accordance with, but is not limited to, IEEE 802.11 protocol. The connection 12 may also be implemented using a wireless connection in accordance with any IEEE 802.11 Wi-Fi protocols, Bluetooth protocols, Bluetooth Low Energy (BLE), or other short range protocols that operate in accordance with a wireless technology standard for exchanging data over short distances using any licensed or unlicensed band such as a CBRS band, 2.4 GHz bands, 5 GHz bands, 6 GHz bands, or 60 GHz bands. The connection 13 between the gateway device 3 and the mobile device 6 may also be implemented through a WAN, a LAN, a VPN, MANs, WLANs, SANs, a DOCSIS network, a fiber optics network (such as FTTH, FTTX, or HFC), a PSDN, a global Telex network, or a 20, 3G, 4G or 5G network, for example. The connection 13 can also be a wired Ethernet connection.

The mobile device 6 can be, for example, a hand-held computing device, a personal computer, a smartphone, an electronic tablet, an e-reader, a personal digital assistant (PDA), or a portable music player with smart capabilities that is capable of connecting to the Internet, cellular networks, and interconnecting with other devices via Wi-Fi and Bluetooth protocols. The mobile device 6 can transmit data to other devices (e.g. wireless extenders 4 and client devices 5) in the system 100. Such data can be transmitted as packet flows.

The respective connections 8, 9, 10 between the cloud-based device 1 and the Internet 7, between the Internet 7 and the SP 2, and between the SP 2 and the gateway device 3 shown in FIG. 1 are meant to be exemplary connections and are not meant to indicate all possible connections between the cloud-based device 1, the Internet 7, the SP 2, and the gateway device 3. Additionally, the respective connections 11 between the gateway device 3 and the wireless extenders 4 shown in FIG. 1 are meant to be exemplary connections and are not meant to indicate all possible connections between the gateway device 3 and the wireless extenders 4. Likewise, the connections 12 between the extenders 4 and the client devices 5 shown in FIG. 1 are meant to be exemplary connections and are not meant to indicate all possible connections between the wireless extenders 4 and client devices 5. Similarly, the connection 13 between the gateway device 3 and the mobile device 6 shown in FIG. 1 is meant to be an exemplary connection and not meant to indicate all possible connections between the gateway device 3 and the mobile device 6.

It is contemplated by the present disclosure that the number of cloud-based devices 1, SPs 2, gateway devices 3, wireless extenders 4, client devices 5, and mobile devices 6 is not limited to the number of cloud-based devices 1, SPs 2, gateway devices 3, wireless extenders 4, client devices 5, and mobile devices 6 shown in FIG. 1.

Figure 2:
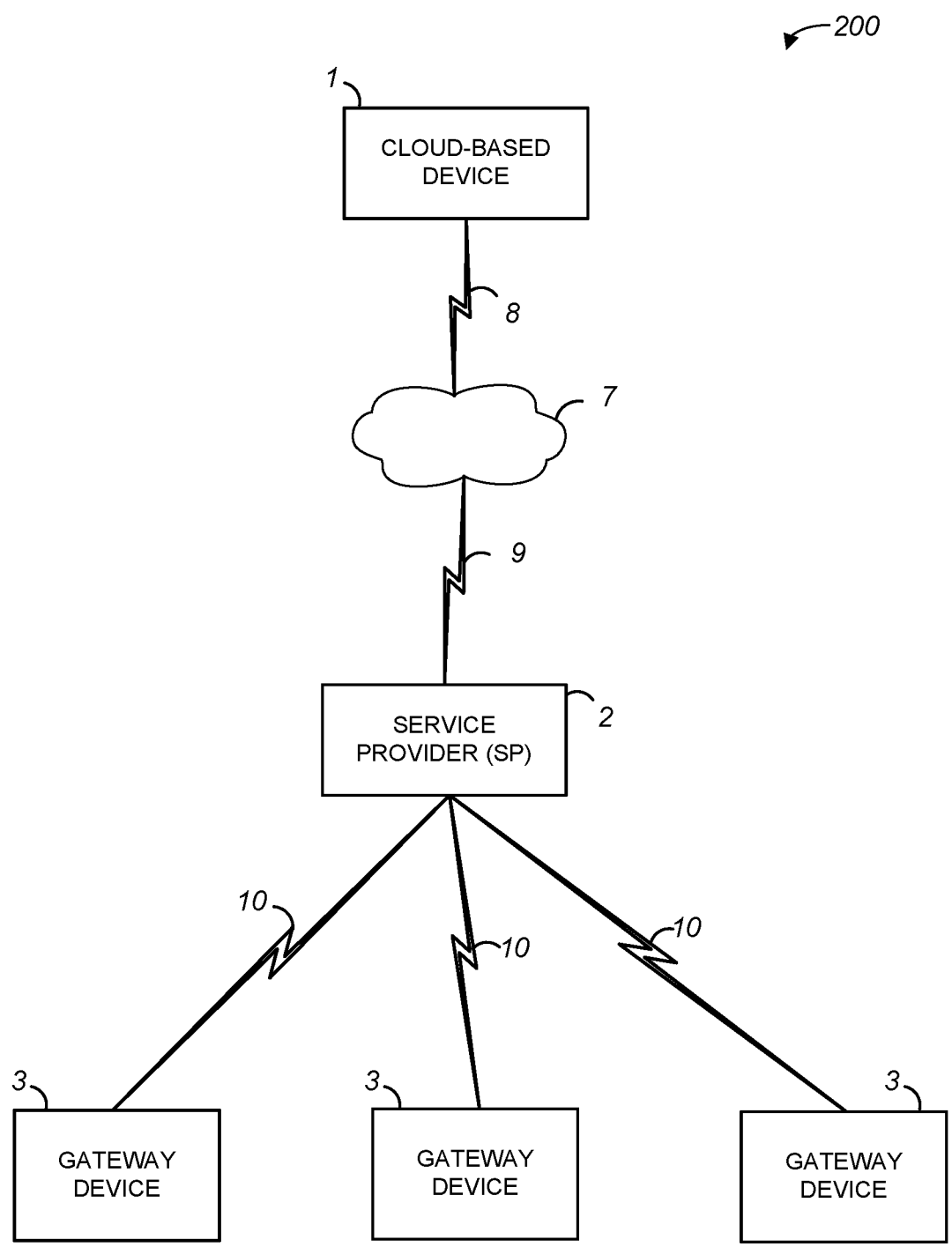
FIG. 2 is a schematic diagram illustrating an exemplary system for enhancing classification of data packets according to an embodiment of the present application.

FIG. 2 includes some of the same devices (e.g., cloud-based device 1, SP 2, gateway 3) and connections (e.g., 7, 8, 9, and 10) as shown and discussed in FIG. 1. As such, the devices and connections shown in FIG. 2 that are same as the device and connections shown in FIG. 1 are identified using the same reference numerals. Additionally, a detailed description of those devices (e.g., cloud-based device 1, SP 2, gateway 3) and connections (e.g., 7, 8, 9, and 10) has been provided with reference to FIG. 1 and will not be repeated in the description of FIG. 2.

FIG. 2 is an exemplary system for enhancing classification of data packets according to an embodiment of the present disclosure. It is contemplated by the present disclosure that each gateway device 3 can be located in the same or separate networks and, if located in separate networks, the separate networks can include devices such as, but not limited to, wireless extenders 4, client devices 5 and mobile devices 6 (e.g., as shown in FIG. 1). Additionally, each gateway device 3 can communicate with other devices in the system 200, for example, the cloud-based device 1 to transmit notifications including packet data and to receive notifications including packet data, and updated or trained MLAs, and policy control information. Although three gateway devices 3 are illustrated in FIG. 2, it is contemplated that any number of gateway devices 3 may be in the system 200.

It is contemplated by the present disclosure that the cloud-based device 1 can, for example, train an MLA stored in the cloud-based device 1 using the packet data received from the gateway devices 3, and transmit the trained MLA to the gateway devices 3 in the system 200. That is, the trained MLA transmitted by the cloud-based device 1 can be used to update or replace the MLA in the gateway devices 3. The cloud-based device 1 can transmit notifications including packet data received from other devices outside of the system 100 (e.g., other gateway devices as shown in FIG. 1) to the gateway devices 3 in the system 200 for further training their respective MLAs.

Additionally, the cloud-based device 1 can also transmit notifications including packet data, and/or trained MLAs to other devices outside of the system 200 (e.g., other gateway devices as shown in FIG. 1). For example, the packet data can be used by the other gateway devices outside the system 100 (e.g., other gateway devices as shown in FIG. 1) to further train their respective MLAs. On the other hand, the trained MLA transmitted by the cloud-based device 1 to the other devices outside the system 100 (e.g., other gateway devices as shown in FIG. 1) can be used to update or replace the respective MLAs. In this regard, the cloud-based device 1 can operate as a WAN-side aggregator utilizing packet data included in notifications for training and updating MLAs utilized in gateway devices 3 in various systems and networks.

Figure 3:
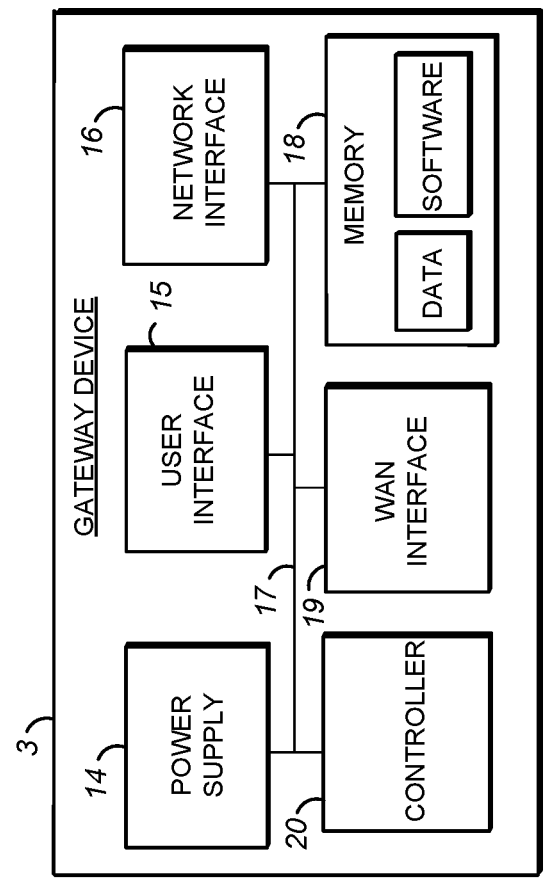
FIG. 3 is a more detailed schematic diagram illustrating an exemplary gateway device in the systems of FIGS. 1 and 2.

A detailed description of the example internal components of the gateway devices 3 shown in FIGS. 1 and 2 will be provided in the discussion of FIG. 3. However, in general, it is contemplated by the present disclosure that the gateway devices 3 include electronic components or electronic computing devices operable to receive, transmit, process, store, and/or manage data and information associated with the systems 100, 200, which encompasses any suitable processing device adapted to perform computing tasks consistent with the execution of computer-readable instructions stored in a memory or a computer-readable recording medium.

Further, any, all, or some of the computing devices in the gateway devices 3 may be adapted to execute any operating system, including Linux, UNIX, Windows, MacOS, DOS, and ChromeOS as well as virtual machines adapted to virtualize execution of a particular operating system, including customized and proprietary operating systems. Each gateway device 3 is further equipped with components to facilitate communication with other computing devices over the one or more network connections to local and wide area networks, wireless and wired networks, public and private networks, and any other communication network enabling communication in the systems 100, 200.

FIG. 3 illustrates a more detailed schematic diagram of an example gateway device 3 in the system 100, 200 for enhancing classification of data packets in an electronic device according to an embodiment of the present disclosure. Although FIG. 3 shows one gateway device 3, the figure is meant to be representative of the other gateway devices 3 shown in FIGS. 1 and 2.

The gateway device 3 is a hardware electronic device that performs the function of a stand-alone cable modem or a combination modem and gateway device that combines the functions of a modem, access point and/or a router for providing received content to network devices (e.g., client devices 5, wireless extenders 4, and mobile device 6) in the system 100, 200. It is also contemplated by the present disclosure that the gateway device 3 can include the function of, but is not limited to, an IP/QAM STB or SMD that is capable of decoding audio/video content, and playing OTT or MSO provided content.

The gateway device 3 can communicate with other devices in the system 100, 200, for example, the cloud-based device 1 to transmit notifications including packet data and to receive notifications including packet data, trained or updated MLAs, and policy control information. The gateway device 3 is capable of processing received packets according to low latency technology developed for the Data Over Cable Service Interface Specification (DOCSIS) standard. As shown in FIG. 3, the gateway device 3 includes a power supply 14, user interface 15, a network interface 16, a memory 18, a WAN interface 19 and a controller 20.

The power supply 14 supplies power to the internal components of the gateway device 3 through the internal bus 17. The power supply 14 can be a self-contained power source such as a battery pack with an interface to be powered through an electrical charger connected to an outlet (e.g., either directly or by way of another device).

The user interface 15 includes, but is not limited to, push buttons, a keyboard, a keypad, a liquid crystal display (LCD), a thin film transistor (TFT), a light-emitting diode (LED), a high definition (HD) or other similar display device including a display device having touch screen capabilities so as to allow interaction between a user and the gateway device 3.

The network interface 16 includes various network cards, and circuitry implemented in software and/or hardware to enable communications using the communication protocols of connections 11 and 13 (e.g., as previously described with reference to FIG. 1).

The memory 18 includes a single memory or one or more memories or memory locations that include, but are not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 18 can be used to store any type of data, including, but not limited to, packets and data relating to each packet. Data related to each packet includes, but is not limited to, a source Internet Protocol (IP) address of an electronic device (e.g., wireless extenders 4, client devices 5 and mobile device 6) transmitting the packet, a destination IP address of the electronic device receiving the packet, a communication protocol used to transmit the packet, a source port number of the electronic device from which the packet was transmitted, and a destination port number of the electronic device receiving the packet.

The data related to each packet may be referred to as an n-tuple. An n-tuple is a finite list of "n" ordered items of data. Because the data related to each packet includes data for five different items, it can be considered a 5-tuple. When the data for any one of the five different items is different, the 5-tuple is considered to be different.

An IP address is a numerical label assigned to each device connected to a computer network that uses the Internet Protocol for communication. An IP address serves two main functions: host or network interface identification and location addressing. A port number is always associated with an IP address of a host and the type of transport protocol used for communication. It completes the destination or origination network address of a message. Specific port numbers are reserved to identify specific services so that an arriving packet can be easily forwarded to a running application. The most common transport protocols that use port numbers are the Transmission Control Protocol (TCP) and the User Datagram Protocol (UDP). Thus, example communication protocols for transmitting packets as described herein include, but are not limited to, TCP and UDP.

Additionally, the memory 18 can be used to store any type of instructions and/or software, for example, simple network management protocol (SNMP) software or other software which enables the gateway device 3 to support the use of the same or similar protocol such as the SNMP protocol. Moreover, the memory 18 can be used to store any type of instructions and/or software to support the use of the same or similar protocol as LLD. Additionally, the memory 18 can be used to store policy control information received from, for example, the SP 2. Alternatively, a user may enter the policy control information into the gateway device 3. Policy control information includes, but is not limited to, rules regarding certain periods of time during which results generated by a machine learning algorithm may be modified to treat packet flows as low latency or certain periods of time in which low latency rules should not be applied. Furthermore, the memory 18 can be used to store any type of instructions and/or software associated with algorithms, processes, or operations for controlling the general functions and operations of the gateway device 3.

The WAN interface 19 may include various network cards and circuitry implemented in software and/or hardware to enable communications between the gateway device 3 and the SP 2 using communications protocols in accordance with connection 10 (e.g., as previously described with reference to FIG. 1).

The controller 20 controls the general operations of the gateway device 3 and includes, but is not limited to, a central processing unit (CPU), a hardware microprocessor, a hardware processor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 3. Communication between the components (e.g., 14-16 and 18-20) of the gateway device 3 is established using the internal bus 17.

It is contemplated by the present disclosure that the cloud-based device 1 has similar structure and functionality as the gateway device 3. Thus, it should be understood that the cloud-based device 1 may store the same or similar data and software as the gateway device 3 which enable performing the same or substantially the same functions as the gateway device 3.

Moreover, the cloud-based device 1 may be any type of server computer implemented as a network server or network computer capable of receiving and transmitting notifications including packet data to and from the gateway device 3 in the system 100 (e.g., other gateway devices as shown in the system 200 of FIG. 2). The cloud-based device 1 can also train a machine learning algorithm (MLA) stored therein using the packet data received from the gateway device 3, and transmit the trained MLA to the gateway device 3 in the system 100. The cloud-based device 1 can also transmit notifications including packet data, and trained MLAs to other devices outside of the system 100 (e.g., other gateway devices as shown in the system 200 of FIG. 2).

Figure 4:
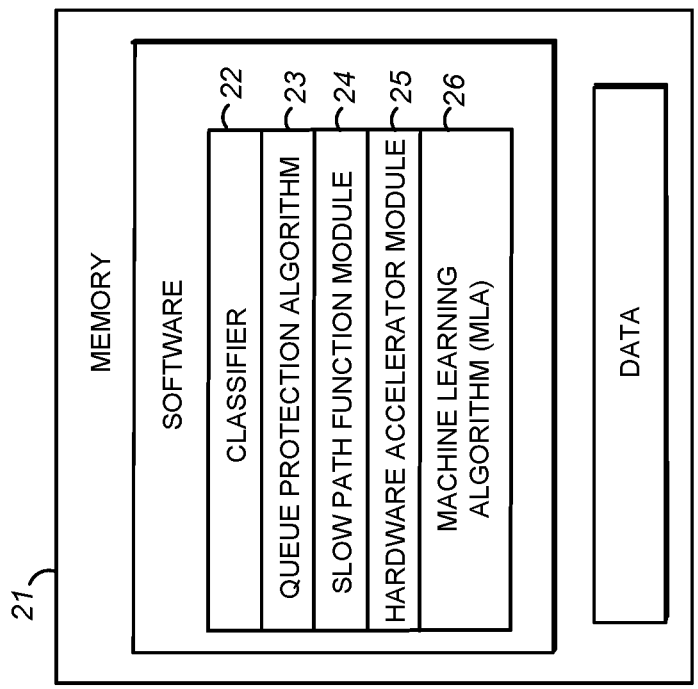
FIG. 4 is a schematic diagram illustrating a memory that may be included in any device in the systems illustrated in FIGS. 1 and 2.

FIG. 4 is a schematic diagram illustrating an example memory 21 that may include a single memory or one or more memories or memory locations that include, but are not limited to, a random access memory (RAM), a dynamic random access memory (DRAM), a memory buffer, a hard drive, a database, an erasable programmable read only memory (EPROM), an electrically erasable programmable read only memory (EEPROM), a read only memory (ROM), a flash memory, logic blocks of a field programmable gate array (FPGA), a hard disk or any other various layers of memory hierarchy.

The memory 18 described herein with reference to the gateway device 3 may be implemented as the memory 21. Additionally, the memory in another device (e.g., cloud-based device 1) in the system 100, 200 may be implemented using the memory 21.

The memory 21 can be used to store any type of data, including, but not limited to, packets and data relating to the packets. Data related to each packet includes, but is not limited to, a source Internet Protocol (IP) address of an electronic device (e.g., wireless extenders 4, client devices 5 and mobile device 6) transmitting the packet, a destination IP address of the electronic device receiving the packet, a communication protocol used to transmit the packet, a source port number of the electronic device from which the packet was transmitted, and a destination port number of the electronic device receiving the packet.

The memory 21 can also be used to store any type of instructions and/or software, for example, a classifier 22, a queue protection (QP) algorithm 23, a slow path module 24, a hardware accelerator module 25, and a machine learning algorithm (MLA) 26. All or part of the contents of the memory 21 may be stored in the same or different device in the systems 100, 200. The classifier 22, for example, can function to assign packets to the LLD service flow queue or the classic service flow queue using information in the header of respective packets.

The QP algorithm 23 can function to facilitate efficient packet processing by, for example, identifying packets contributing to the growth of the LLD service flow queue, moving the identified packets to a classic flow queue, and sending a notification to the MLA 26 that includes the packet data of the identified packet. The slow path module 24 can, for example, enable the gateway device 3 to implement a slow path function in which decisions can be made regarding actions to be taken for processing received packets. Additionally, the slow path module 24 can, for example, facilitate changing packet header information to process packets using the low latency service flow or the classic service flow.

Each packet header includes a differential services field which includes an 8-bit Differentiated Services Code Point (DSCP) field and a 2-bit Explicit Congestion Notification (ECN) field. The DSCP field can be used to determine packet traffic classification for network data. For example, the DSCP field can be used to determine which network traffic requires higher bandwidth and has a higher priority. The ECN field can allow end-to-end notification of network congestion without dropping packets. The DSCP/ECN fields may be changed to classify packets to be processed using the low latency service flow or the classic service flow.

The hardware accelerator module 25 can, for example, facilitate implementing a fast flow function of the gateway device 3 by, for example, changing the DSCP/ECN fields to process packets using the low latency service flow or the classic service flow. MLAs 26 include at least classifiers and regressors. Examples of MLAs 26 include, but are not limited to, support vector machine learning algorithms, decision tree classifiers, linear discriminant analysis learning algorithms, and artificial neural network learning algorithms. Decision tree classifiers include, but are not limited to, random forest algorithms.

The MLA 26 can be trained to categorize packets received at a device in the system 100 or the system 200, for example, the gateway device 3 for processing using the LLD service flow or the classic service flow. The MLA 26 can be trained by any device in the system 100 or in the system 200, for example, the cloud-based device 1 or the gateway device 3. Moreover, the MLA 26 can, for example, train an MLA model which can be used to categorize packets. The gateway device 3 can use data of received packets to train the MLA 26 to enhance classification of the received packets to be processed by the LLD service flow or the classic service flow. Alternatively, or additionally, the gateway device 3 can transmit the packet data to the cloud-based device 1.

The cloud-based device 1 can also train a machine learning algorithm (MLA) stored therein using the packet data included in notifications received from the gateway device 3, and transmit the trained MLA to the gateway device 3 in the system 100. The cloud-based device 1 can also transmit notifications including packet data, and trained MLAs to other devices outside of the system 100 (e.g., other gateway devices as shown in the system 200 of FIG. 2). Moreover, the memory 21 can be used to store any type of instructions and/or software to support the use of the same or similar protocol as LLD. Furthermore, the memory 21 can be used to store any type of instructions and/or software associated with algorithms, processes, or operations for controlling the general functions and operations of the device in which the instructions are stored.

Figure 5:
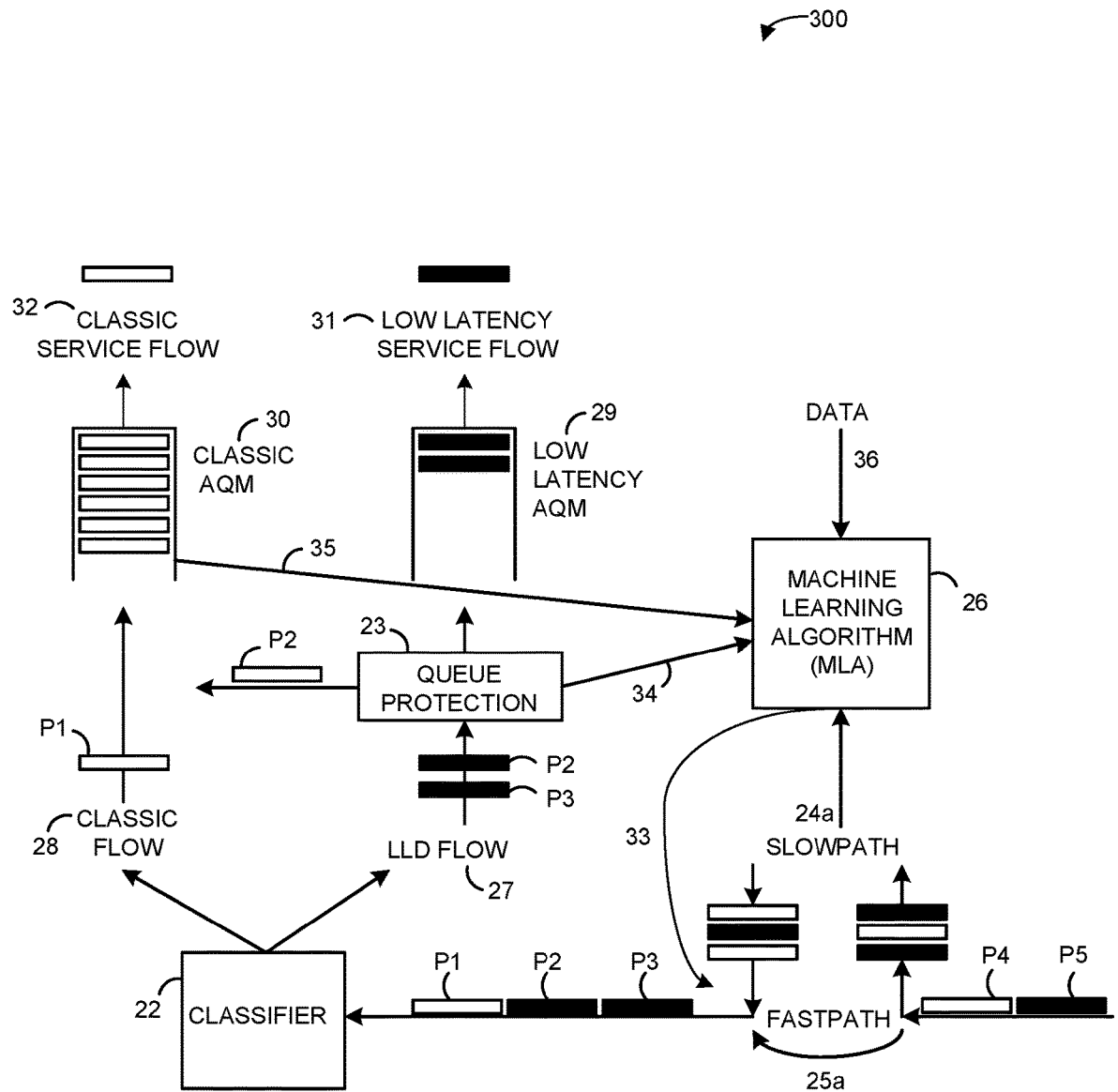
FIG. 5 is a diagram illustrating an exemplary process for processing packets according to an embodiment of the present disclosure.

FIG. 5 is a diagram illustrating an exemplary packet processing system 300 according to an embodiment of the present disclosure. The system 300 can be implemented by, for example, any gateway device 3 or cloud-based device 1 included in the system 100, 200. The packet processing system 300 includes a classifier 22, an LLD service flow queue 27, a classic service flow queue 28, the Queue Protection (QP) algorithm 23, a low latency active queue management (AQM) function 29, a classic AQM function 30, a low latency service flow 31, a classic service flow 32, a slow path function 24a implemented by the slow path module 24, a fast path function 25a implemented by the hardware accelerator module 25, and the MLA 26. Although the exemplary packet processing system 300 includes a single LLD service flow queue 27, it is contemplated by the present disclosure that any number of LLD service flow queues 27 may be included in the system 300, for example, sixteen. The AQM 29, 30 facilitates probabilistically dropping packets from a queue before the queue becomes full.

The system 300 also includes five exemplary packets P1, P2, P3, P4 and P5 that may be processed using the system 300. Packets P1, P2, and P3, for example, can be processed by the slow path function 24a and/or the fast path function 25a and by the classifier 22. Packets P4 and P5 can be in line to be processed by the slow path function 24a and/or the fast path function 25a. Although the system 300 includes five packets for processing, it is contemplated by the present disclosure that any number of packets may be processed by the system 300.

The low latency service flow 31 is for non-queue building packet traffic which requires low latency. The classic service flow 32 is for queue building packet traffic which can tolerate higher latency. The classifier 22 assigns packets to the LLD service flow queue 27 or the classic service flow queue 28. For example, the classifier assigned packet P1 to the classic flow queue 28 and assigned packets P2 and P3 to the LLD service flow queue 27.

The QP algorithm 23 can identify packets like packet P2, for example, in the LLD service flow queue 27 that are contributing to the growth of the delay of the LLD service flow queue 27 and thus to the delay in the round-trip time of low latency packets. The QP algorithm 23 can also move the identified packet(s) like packet P2 to the classic service flow queue 28 to avoid flooding the LLD service flow queue 27. Thus, it can be seen that some packets can be incorrectly assigned to the LLD service flow queue 27 and as a result contribute to delay in the low latency service flow 31, which negatively effects the round-trip time of genuine low latency packets.

To address this problem, a first packet, for example, packet P4 in a packet flow received by the gateway device 3 can be processed using the slow path function 24a. To properly and efficiently process the packets in a received packet flow or session, the gateway device 3 also includes the fast path function 25a. For example, the first packet can be processed using the slow path function 24a and the subsequent packets can be processed using the fast path function 25a. The slow path function 24a is implemented by the slow path module 24 and can perform operations on the first packet and decide which actions to take regarding processing the first packet. These actions are provided to the hardware accelerator module 25 so actions may be taken by the fast path function 25a with regard to subsequent packets in the packet flow. An action to be taken may be, for example, modifying the DSCP/ECN field of packets to correspond to a category determined by the MLA 26.

As part of processing the first packet (e.g., P4) using the slow path function 24a, the n-tuple of the first packet is processed by the MLA 26. The n-tuple of the first packet is the data related to the packet. As such the n-tuple includes, but is not limited to, a source Internet Protocol (IP) address of an electronic device (e.g., wireless extenders 4, client devices 5 and mobile device 6) transmitting the packet, a destination IP address of the electronic device (e.g., gateway device 3) receiving the packet, a communication protocol used to transmit the packet, a source port number of the electronic device from which the packet was transmitted, and a destination port number of the electronic device receiving the packet.

Because the n-tuple for the first packet includes data for five different items, the n-tuple may be considered a 5-tuple. When the data for any one of the "n" different items is different, the n-tuple is considered to be different. Thus, when the data for any one of the five different items is different, the 5-tuple is considered to be different. The MLA 26 can categorize the first packet to be processed using the low latency service flow 32 or the classic service flow 31. For example, the MLA 26 can categorize the first packet as "LLD" to indicate processing by the low latency service flow 31 or "non-LLD" to indicate processing by the classic service flow 32. Any change in the category indication is notified by the MLA 26 to the other logic in the memory 18, 21 of the gateway device 3 to modify field data of the remaining packets in the packet flow to be processed using the fast path function 25a. Moreover, the MLA 26 can create and train an MLA model which can be used to categorize packets.

Each packet header includes, for example, a differential services field which includes an 8-bit Differentiated Services Code Point (DSCP) field and a 2-bit Explicit Congestion Notification (ECN) field. The DSCP field can be used to determine packet traffic classification for network data. The ECN field can allow end-to-end notification of network congestion without dropping packets. When the DSCP and ECN field data correspond to the category determined by the MLA 26, processing of the first packet is completed using the slow path function 24a. The category determined by the MLA 26 is also provided to the fast path function 25a which processes the remaining packets in the flow.

However, when the category determined by the MLA 26 does not correspond to the DSCP/ECN field data, the DSCP/ECN field data of the first packet is modified to correspond to the determined category. For example, if the first packet is categorized as "non-LLD" and the DSCP/ECN field data does not correspond to "LLD", the DSCP/ECN field data is modified to correspond to "non-LLD." Similarly, if the determined category is "LLD" and the DSCP/ECN field data corresponds to "non-LLD," the DSCP/ECN field data is modified to correspond to "LLD." Additionally, the hardware accelerator module 25 implementing the fast path function 25a is notified 33 of the determined category and similarly modifies the DSCP/ENC field data of the remaining packets in the received packet flow to correspond to the determined category.

It is contemplated by the present disclosure that after a first packet of a packet flow with a particular n-tuple is categorized by the MLA 26 via the slow path function 24a, the remaining packets in the packet flow are categorized using the fast path function 25a.

After being processed by the slow path function 24a or the fast path function 25a, the packets are processed by the classifier 22 which assigns each packet to the service flow corresponding to the DSCP/ECN information in the header of each respective packet. The QP algorithm 23 can identify packets in the LLD service flow queue 27 contributing to the growth of the LLD service flow queue 27 delay and can move the identified packets to the classic service flow queue 28. Additionally, for each identified packet the QP algorithm 23 can send a notification 34 to the MLA 26 that includes the n-tuple of the identified packet.

It is contemplated by the present disclosure that the classic service flow queue 28 may be periodically checked for packets exhibiting low latency behavior. For each packet identified as exhibiting low latency behavior, a notification 35 including the n-tuple of the identified packet is sent to the MLA 26 to further train the MLA 26 to more accurately categorize packets having the same n-tuple as the packet exhibiting low latency behavior.

It should be understood that each packet identified by the QP algorithm 23 and each packet identified as exhibiting low latency behavior may have been incorrectly categorized by the MLA 26. Thus, the notifications 34, 35 and n-tuple of each identified packet are sent to the MLA 26 to further train the MLA 26 to facilitate more accurately categorizing packets having the same n-tuple as the identified packets. It is contemplated by the present disclosure that further training the MLA 26 enables the MLA 26 to more accurately categorize packets. As a result, delays due to queue building in the low latency service flow 31 are facilitated to be reduced which facilitates achieving a one millisecond round-trip delay time for time sensitive applications like on-line gaming.

Although the notifications 34, 35 are sent to the MLA 26 as described herein with reference to FIG. 5, the notifications 34, 35 may additionally be sent to the cloud-based device 1. The notifications 34, 35 may be sent to the cloud-based device 1 at the same time the notifications 34, 35 are sent to the MLA 26. Alternatively, the notifications 34, 35 generated within a predetermined time period may be sent to the cloud-based device 1 in a single transmission.

The n-tuple in the notifications 34, 35 may be used to train, for example, an updated MLA 26 stored in the cloud-based device 1. The trained updated MLA 26 may be transmitted to and received 36 by devices in the systems 100, 200, for example, the gateway device 3. Additionally, or alternatively, the cloud-based device 1 may transmit the notifications 34, 35 including the n-tuple for receipt 36 by the other gateway devices 3 in the systems 100, 200 and the other gateways devices 3 may further train the respective MLAs 26 stored therein using the n-tuple. Furthermore, the gateway device 3 may receive 36 policy control information from the SP 2. Alternatively, a user may enter the policy control information into the gateway device 3. Policy control information includes, but is not limited to, rules regarding certain periods of time during which results generated by a MLA may be modified to treat packet flows as low latency or certain periods of time in which low latency rules should not be applied.

As a result of processing packets as described herein with reference to FIG. 5, delays due to queue building in the low latency service flow 31 are facilitated to be reduced which facilitates achieving a one millisecond round-trip delay time for time sensitive applications like on-line gaming.

Figure 6:
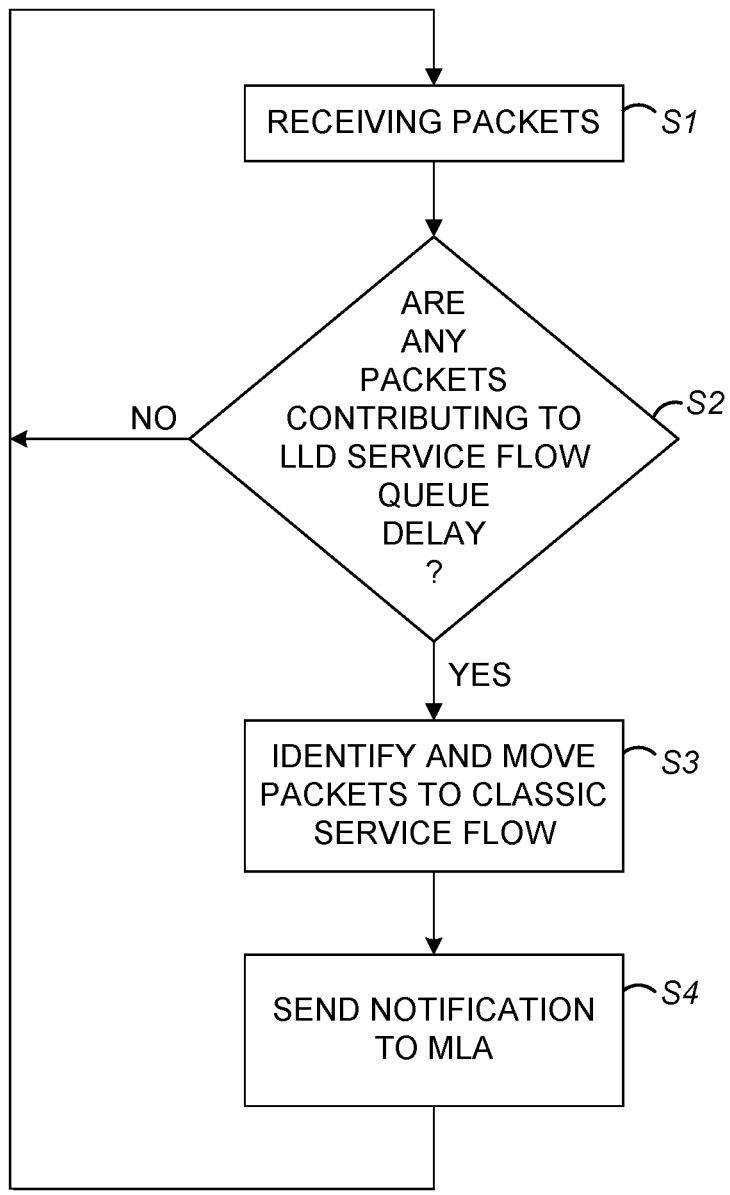
FIG. 6 is an exemplary method and algorithm for identifying packets in a low latency DOCSIS (LLD) service flow queue that are contributing to the growth of the LLD service flow queue according to an embodiment of the present disclosure.

FIG. 6 is an exemplary method and algorithm for identifying a packet in a LLD service flow queue contributing to growth of a LLD service flow queue delay according to an embodiment of the present disclosure. FIG. 6 illustrates exemplary operations performed by the gateway device 3 when a packet in the LLD service flow queue 27 is identified as contributing to growth in the LLD service flow queue 27 delay. Additionally, the exemplary method and algorithm of FIG. 6 include operations that are performed by the software executed by the controller 20 of the gateway device 3.

In step S1, the software executed by the controller 20 causes the gateway device 3 to receive a flow of packets and to use the classifier 22 to assign each packet to the LLD service flow queue 27 or the classic service flow queue 28. In step S2, the QP algorithm 23 in the gateway device 3 monitors the packets in the LLD service flow queue 27 to determine whether any of the packets are contributing to growth of the LU) service flow queue 27 delay. If not, in step S1, the gateway device 3 receives additional packets. However, if any packets in the LLD service flow queue 27 are contributing to growth of the LLD service flow queue 27 delay, in step S3, the QP algorithm 23 identifies the packets and moves the identified packets to the classic service flow queue 28. Doing so avoids flooding the LLD service flow queue 27. Next, in step S4, the QP algorithm 23 generates a notification 34 for each identified packet and sends the notifications 34 to the MLA 26 included in the gateway device 3. Each notification 34 includes the n-tuple of the respective identified packet.

It should be understood that each packet identified by the QP algorithm 23 may have been incorrectly categorized by the MLA 26. Thus, the notification 34 and n-tuple of each identified packet are sent to the MLA 26 to further train the MLA 26 to enable the MLA 26 to more accurately categorize packets. As a result, delays due to queue building in the low latency service flow 31 are facilitated to be reduced which facilitates achieving a one millisecond round-trip delay time for time sensitive applications like on-line gaming.

Although the notifications 34 are sent to the MLA 26, the gateway device 3 may additionally send the notifications 34 to the cloud-based device 1 at the same time the notifications 34 are sent to the MLA 26. Alternatively, the notifications 34 generated within a predetermined time period may be sent to the cloud-based device 1 in a single transmission.

Figure 7:
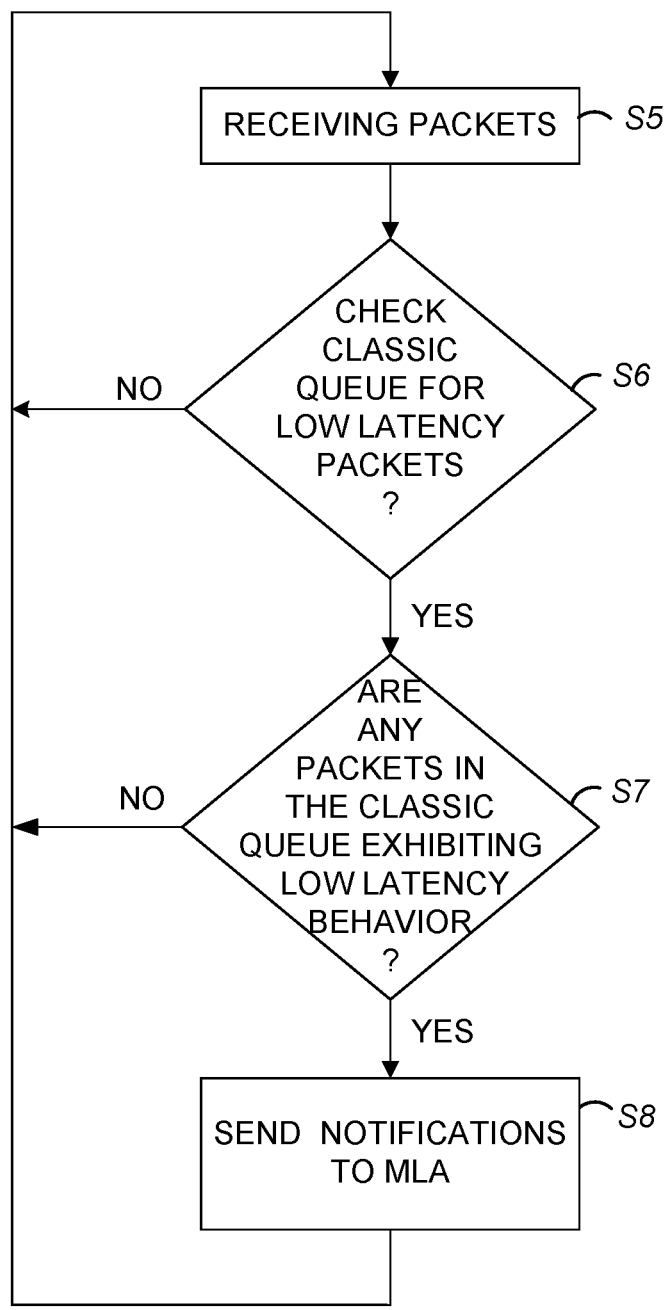
FIG. 7 is an exemplary method and algorithm for identifying packets exhibiting low latency behavior in a classic service flow according to an embodiment of the present disclosure.

FIG. 7 is an exemplary method and algorithm for identifying a packet in a classic service flow queue exhibiting low latency behavior according to an embodiment of the present disclosure. FIG. 7 illustrates exemplary operations performed by the gateway device 3 when a packet in the classic service flow queue 28 is identified as exhibiting low latency behavior. Additionally, the exemplary method and algorithm of FIG. 7 includes operations that are performed by the software executed by the controller 20 of the gateway device 3.

In step S5, the software executed by the controller 20 causes the gateway device 3 to receive a flow of packets and to use the classifier 22 to assign each packet to the LLD service flow queue 27 or the classic service flow queue 28. In step S6, the gateway device 3 determines whether or not the classic service flow queue 28 should be checked for packets exhibiting low latency behavior. The classic service flow queue 28 may be checked at any time, for example, every five (5) minutes or at any random time.

When it is not time to check the classic service flow queue 28, in step S5, the gateway device 3 receives additional packets. However, when it is time to check the classic service flow queue 28, in step S7, the gateway device 3 determines whether or not any packets in the classic service flow queue 28 are exhibiting low latency behavior. If not, in step S5, the gateway device 3 receives additional packets. However, if any packet in the classic service flow queue 28 is exhibiting low latency behavior, in step SR, the packet is identified, a notification 35 is generated that includes the n-tuple(s) of the identified packet or packets, and the notifications 35 are sent to the MLA 26. Although the notifications 35 are sent to the MLA 26, the gateway device 3 may additionally send the notifications 35 to the cloud-based device 1 at the same time the notifications are sent to the MLA 26. Alternatively, the notifications 35 generated within a predetermined time period may be sent to the cloud-based device 1 in a single transmission.

Figure 8:
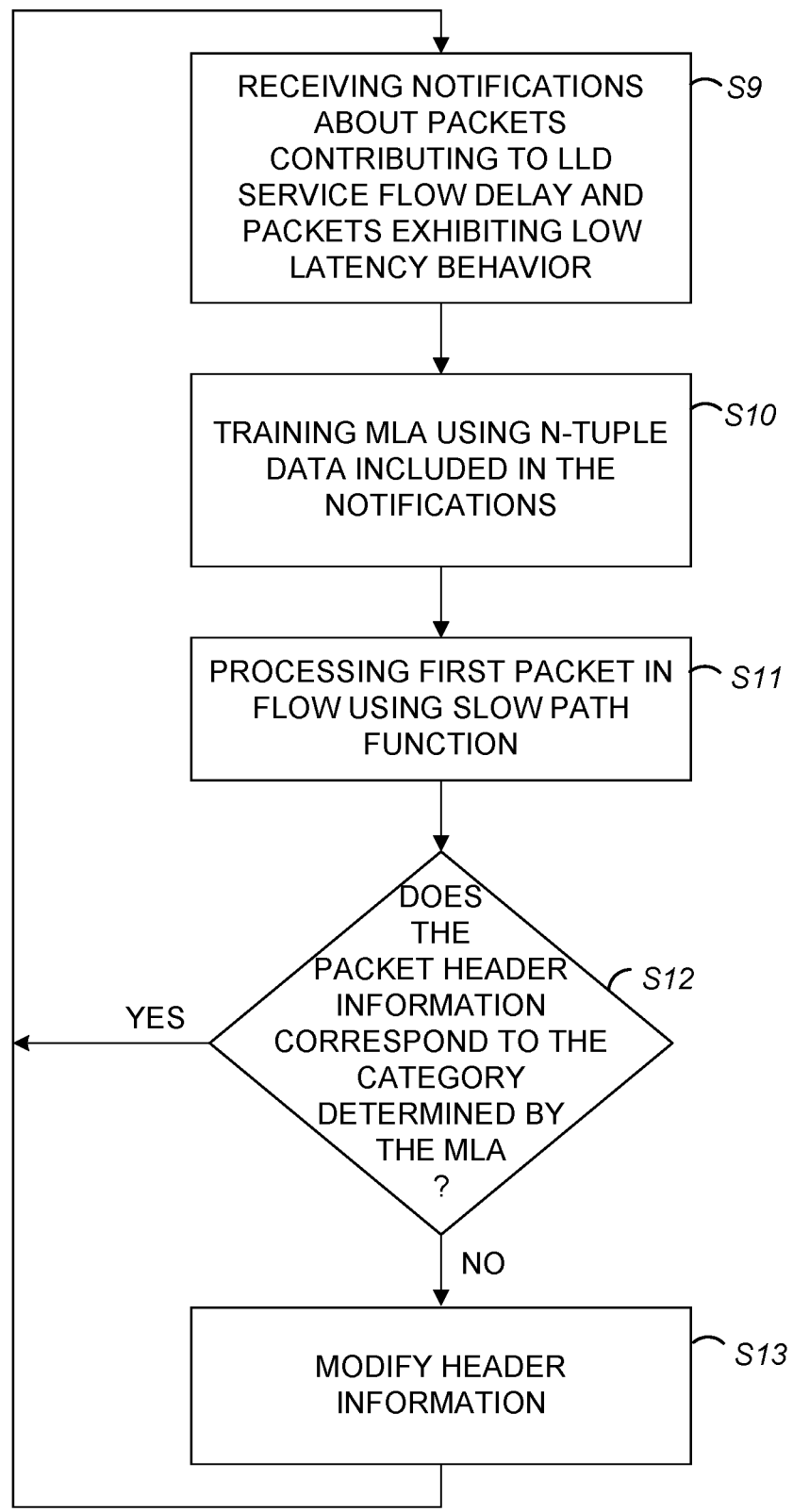
FIG. 8 is an exemplary method and algorithm for enhancing classification of data packets in an electronic device according to an embodiment of the present disclosure.

FIG. 8 is an exemplary method and algorithm for enhancing classification of packets in an electronic device in the systems 100, 200 according to an embodiment of the present disclosure. FIG. 8 illustrates exemplary operations performed by the gateway device 3 to enhance classification of packets. Additionally, the exemplary method and algorithm of FIG. 8 include operations that are performed by the software executed by the controller 20 of the gateway device 3. In step S9, the software executed by the controller 20 causes the machine learning algorithm (MLA) 26 in the gateway device 3 to receive a notification 34 for each packet identified as contributing to growth of the LLD service flow queue 27 delay and a notification 35 for each packet in the classic service flow queue 28 identified as exhibiting low latency behavior.

Each notification 34, 35 includes an n-tuple of the respective identified packet. The n-tuple includes, but is not limited to, a source Internet Protocol (IP) address of an electronic device (e.g., wireless extenders 4, client devices 5 and mobile device 6) transmitting the packet, a destination IP address of the electronic device (e.g., gateway device 3) receiving the packet, a communication protocol used to transmit the packet, a source port number of the electronic device from which the packet was transmitted, and a destination port number of the electronic device receiving the packet. In step S10, the n-tuple of each received notification 34, 35 is used to train the MLA 26. It should be understood that each identified packet may have been incorrectly categorized by the MLA 26. Thus, the notifications 34, 35 and n-tuple of each identified packet are sent to the MLA 26 to further train the MLA 26 to enable the MLA 26 to more accurately categorize packets.

In step S11, a first packet, for example, P4 in a packet flow or session received by the gateway device 3 can be processed using the slow path function 24a of the gateway device 3. Alternatively, or additionally, other packets in the beginning of a packet flow may be processed using the slow path function 24a. The slow path function 24a can perform operations on the first packet and decide which actions to take regarding processing the first packet. These actions are also provided to the fast path function 25a so the same actions may be taken by the fast path function 25a with regard to subsequent packets in the packet flow. An action to be taken may be, for example, modifying the DSCP/ECN field of packets to correspond to a category generated by the MLA 26.

It is contemplated by the present disclosure that after a first packet of a packet flow with a particular n-tuple is categorized by the MLA 26 via the slow path function 24a, the remaining packets in the packet flow are categorized using the fast path function 25a. As part of processing the first packet using the slow path function 24a, the n-tuple of the first packet is processed by the MLA 26. The MLA 26 categorizes the first packet as "LLD" or "non-LLD".

Next, in step S12, the software executed by the controller 20 causes the gateway device 3 to determine whether or not packet header information of the first packet corresponds to the category determined by the MLA 26. Each packet header includes, for example, a differential services field which includes an 8-bit Differentiated Services Code Point (DSCP) field and a 2-bit Explicit Congestion Notification (ECN) field. When the DSCP/ECN field data corresponds to the category determined by the MLA 26, processing of the first packet is completed using the slow path function 24a. The category determined by the MLA 26 is provided to the fast path function 25a which processes the remaining packets in the flow. Next, in step S9, the MLA 26 receives a notification 34 for each packet identified as contributing to growth of the LLD service flow queue 27 delay and a notification 35 for each packet in the classic service flow queue 28 identified as exhibiting low latency behavior.

However, when the category determined by the MLA 26 does not correspond to the DSCP/ECN field data, in step S13, the DSCP/ECN field data of the first packet is modified to correspond to the category determined by the MLA 26. For example, if the determined category is "non-LLD" and the DSCP/ECN field data corresponds to "LLD", the DSCP/ECN field data is modified to correspond to "non-LLD". Similarly, if the determined category is "LLD" and the DSCP/ECN field data corresponds to "non-LLD", the DSCP/ECN field data is modified to correspond to "LLD". Additionally, the hardware accelerator module 25 implementing the fast path function 25a is notified of the determined category and similarly modifies the DSCP/ENC field data of the remaining packets in the received packet flow to correspond to the category.

Using the methods and algorithms for enhancing classification of data packets in an electronic device facilitates reducing the delay of processing packets by the electronic device which facilitates achieving a one millisecond round-trip delay time for time sensitive applications like on-line gaming.

The present disclosure may be implemented as any combination of an apparatus, a system, an integrated circuit, and a computer program on a non-transitory computer readable recording medium. The one more processors may be implemented as an integrated circuit (IC), an application specific integrated circuit (ASIC), or large scale integrated circuit (LSI), system LSI, super LSI, or ultra LSI components that perform a part or all of the functions described in the present disclosure.

The present disclosure includes the use of software, applications, computer programs, or algorithms. The software, applications, computer programs, or algorithms can be stored on a non-transitory computer-readable medium for causing a computer, such as the one or more processors, to execute the steps described in FIGS. 6, 7, and 8. For example, the one or more memories stores software or algorithms with executable instructions and the one or more processors can execute a set of instructions of the software or algorithms in association with onboarding of wireless extenders in the wireless residential network.

The software and computer programs, which can also be referred to as programs, software applications, applications, components, or code, include machine instructions for a programmable processor, and can be implemented in a high-level procedural language, an object-oriented programming language, a functional programming language, a logical programming language, or an assembly language or machine language. The term computer-readable recording medium refers to any computer program product, apparatus or device, such as a magnetic disk, optical disk, solid-state storage device, memory, and programmable logic devices (PLDs), used to provide machine instructions or data to a programmable data processor, including a computer-readable recording medium that receives machine instructions as a computer-readable signal.

By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Use of the phrases "capable of," "capable to," "operable to," or "configured to" in one or more embodiments, refers to some apparatus, logic, hardware, and/or element designed in such a way to enable use of the apparatus, logic, hardware, and/or element in a specified manner. The subject matter of the present disclosure is provided as examples of apparatus, systems, methods, and programs for performing the features described in the present disclosure. However, further features or variations are contemplated in addition to the features described above. It is contemplated that the implementation of the components and functions of the present disclosure can be done with any newly arising technology that may replace any of the above implemented technologies.

Additionally, the above description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, features described with respect to certain embodiments may be combined in other embodiments.

We claim:

1. An electronic device capable of enhancing classification of packets in a network, the electronic device comprising:
   a network interface;
   a non-transitory memory having instructions stored thereon; and
   a hardware processor configured to execute the instructions to:
   receive, using the network interface, a packet to be processed using a first service flow queue or a second service flow queue, the first service flow queue comprising at least one service flow;
   determine whether a packet to be processed using the second service flow queue is incorrectly classified for processing using the first service flow queue based on a delay in service flow in the first service flow queue caused by the packet;
   move the incorrectly classified packet from the first service flow queue to the second service flow queue;
   transmit a notification for the incorrectly classified packet to a machine learning algorithm (MLA), each notification including data related to the incorrectly classified packet;
   train the MLA using the data in the notifications; and
   categorize, using the trained MLA, at least one new packet to be processed using the first service flow queue or the second service flow queue by modifying packet header information, wherein the at least one new packet is processed based on the category determined by the MLA.

2. The electronic device according to claim 1, wherein the hardware processor further executes the instructions to transmit, using the network interface, the notifications to a cloud-based device for training an updated MLA.

3. The electronic device according to claim 2, wherein the hardware processor further executes the instructions to receive, using the network interface, the trained updated MLA from the cloud-based device.

4. The electronic device according to claim 1, wherein the data included in the notifications comprises:
   a source Internet Protocol (IP) address;
   a destination IP address;
   a communication protocol used to transmit the packet;
   a source port number; and
   a destination port number.

5. The electronic device according to claim 1, wherein the first service flow queue is for processing in a low latency service flow and the second service flow queue is for processing in a classic service flow.

6. The electronic device according to claim 1, wherein the hardware processor further executes the instructions to transmit, using the network interface, the notifications to a cloud-based device for forwarding to another electronic device.

7. The electronic device according to claim 1, wherein the hardware processor further executes the instructions to:
   receive, using the network interface, policy control information; and
   use the policy control information to process the at least one new packet.

8. A method of enhancing classification of data packets in an electronic device comprising:
   receiving, by an electronic device, a packet to be processed using a first service flow queue or a second service flow queue, the first service flow queue comprising at least one service flow;
   determining, by the electronic device, whether a packet to be processed using the second service flow queue is incorrectly classified for processing using the first service flow queue based on a delay in service flow in the first service flow queue caused by the packet;
   moving the incorrectly classified packets from the first service flow queue to the second service flow queue;

transmitting a notification for the incorrectly classified packet to a machine learning algorithm (MLA), each notification including data related to the incorrectly classified packet;
training the MLA using the data in the notifications; and
categorizing, using the trained MLA, at least one new packet to be processed using the first service flow queue or the second service flow queue by modifying packet header information, wherein the at least one new packet is processed based on the category determined by the MLA.

9. The method according to claim 8, further comprising transmitting, by the electronic device, the notifications to a cloud-based device for training an updated MLA.

10. The method according to claim 9 further comprising, receiving, by the electronic device, the trained updated MLA from the cloud-based device.

11. The method according to claim 8, wherein the data included in the notifications comprises:
a source Internet Protocol (IP) address;
a destination IP address;
a communication protocol used to transmit the packet;
a source port number; and
a destination port number.

12. The method according to claim 8, wherein the first service flow queue is for processing in a low latency service flow and the second service flow queue is for processing in a classic service flow.

13. The method according to claim 8, further comprising transmitting the notifications to a cloud-based device for forwarding to another electronic device.

14. The method according to claim 8, further comprising:
receiving policy control information; and
using the policy control information to process the at least one packet.

15. A non-transitory computer-readable recording medium in an electronic device for enhancing classification of data packets in a network, the non-transitory computer-readable recording medium storing instructions which when executed by a hardware processor cause the non-transitory recording medium to perform steps comprising:
receiving a packet to be processed using a first service flow queue or a second service flow queue, the first service flow queue comprising at least one service flow;
determining whether a packet to be processed using the second service flow queue is incorrectly classified for processing using the first service flow queue based on a delay in service flow in the first service flow queue caused by the packet;
moving the incorrectly classified packets from the first service flow queue to the second service flow queue;
transmitting a notification for the incorrectly classified packet to a machine learning algorithm (MLA), each notification including data related to the incorrectly classified packet;
training the MLA using the data in the notifications; and
categorizing, using the trained MLA, at least one new packet to be processed using the first service flow queue or the second service flow queue by modifying packet header information, wherein the at least one new packet is processed based on the category determined by the MLA.

16. The non-transitory computer-readable recording medium according to claim 15, further comprising transmitting the notifications to a cloud-based device for training an updated MLA.

17. The non-transitory computer-readable recording medium according to claim 16, further comprising receiving the trained updated MLA from the cloud-based device.

18. The non-transitory computer-readable recording medium according to claim 15, wherein the data included in the notifications comprises:
a source Internet Protocol (IP) address;
a destination IP address;
a communication protocol used to transmit the packet;
a source port number; and
a destination port number.

19. The non-transitory computer-readable recording medium according to claim 15, wherein the first service flow queue is for processing in a low latency service flow and the second service flow queue is for processing in a classic service flow.

20. The non-transitory computer-readable recording medium according to claim 15, further comprising transmitting the notifications to a cloud-based device for forwarding to another electronic device.

* * * * *